(12) United States Patent
Iseki

(10) Patent No.: US 9,019,554 B2
(45) Date of Patent: Apr. 28, 2015

(54) DISPLAY APPARATUS AND METHOD, IMAGE FORMING APPARATUS, AND NON-TRANSITORY COMPUTER READABLE MEDIUM

(71) Applicant: Fuji Xerox Co., Ltd., Minato-ku, Tokyo (JP)

(72) Inventor: Tomoharu Iseki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/020,490

(22) Filed: Sep. 6, 2013

(65) Prior Publication Data

US 2014/0226168 A1    Aug. 14, 2014

(30) Foreign Application Priority Data

Feb. 14, 2013   (JP) ................ 2013-026417

(51) Int. Cl.
| | | |
|---|---|---|
| *G06K 15/02* | (2006.01) | |
| *G06F 3/12* | (2006.01) | |
| *H04N 1/00* | (2006.01) | |
| *G06F 3/14* | (2006.01) | |
| *G09G 5/00* | (2006.01) | |

(52) U.S. Cl.
CPC .............. *H04N 1/00411* (2013.01); *G06F 3/12* (2013.01); *G06F 3/14* (2013.01); *H04N 1/0032* (2013.01); *H04N 1/00466* (2013.01); *H04N 2201/0091* (2013.01); *G09G 5/00* (2013.01); *G09G 2340/0442* (2013.01); *G09G 2340/045* (2013.01)

(58) Field of Classification Search
None
See application file for complete search history.

(56) References Cited

U.S. PATENT DOCUMENTS

| | | | |
|---|---|---|---|
| 8,089,653 B2 * | 1/2012 | Kobashi ................. 358/1.18 |
| 8,098,398 B2 * | 1/2012 | Takasaki et al. ............ 358/1.2 |
| 8,284,433 B2 * | 10/2012 | Nakagiri et al. ........... 358/1.15 |
| 8,553,241 B2 * | 10/2013 | Sato ........................ 358/1.12 |
| 2002/0054279 A1 * | 5/2002 | Hoshino et al. ............. 355/40 |
| 2003/0007188 A1 * | 1/2003 | Hoshino et al. ............ 358/401 |
| 2006/0039707 A1 * | 2/2006 | Mima ........................ 399/23 |
| 2006/0170948 A1 * | 8/2006 | Kobashi ................... 358/1.13 |
| 2007/0282051 A1 | 12/2007 | Okano |
| 2008/0225032 A1 * | 9/2008 | Nishimi et al. ............ 345/211 |
| 2009/0168081 A1 * | 7/2009 | Takasaki et al. ............ 358/1.2 |
| 2010/0171992 A1 * | 7/2010 | Pinney .................... 358/3.29 |
| 2011/0141506 A1 * | 6/2011 | Sato ........................ 358/1.12 |
| 2012/0121308 A1 * | 5/2012 | Higuchi et al. ............ 400/621 |

FOREIGN PATENT DOCUMENTS

| | | |
|---|---|---|
| JP | 09-016351 A | 1/1997 |
| JP | 2000-108467 A | 4/2000 |
| JP | 2008-015491 A | 1/2008 |

* cited by examiner

*Primary Examiner* — Marcus T Riley
(74) *Attorney, Agent, or Firm* — Sughrue Mion, PLLC

(57) ABSTRACT

A display apparatus includes a display and a display controller. The display displays an image formed by an image forming apparatus. The display controller controls the display to reduce size of at least part of an image serving as a to-be-formed image formed by the image forming apparatus and to display the size-reduced image, in accordance with content of post-processing performed on a recording medium on which the image has been formed by the image forming apparatus.

15 Claims, 16 Drawing Sheets

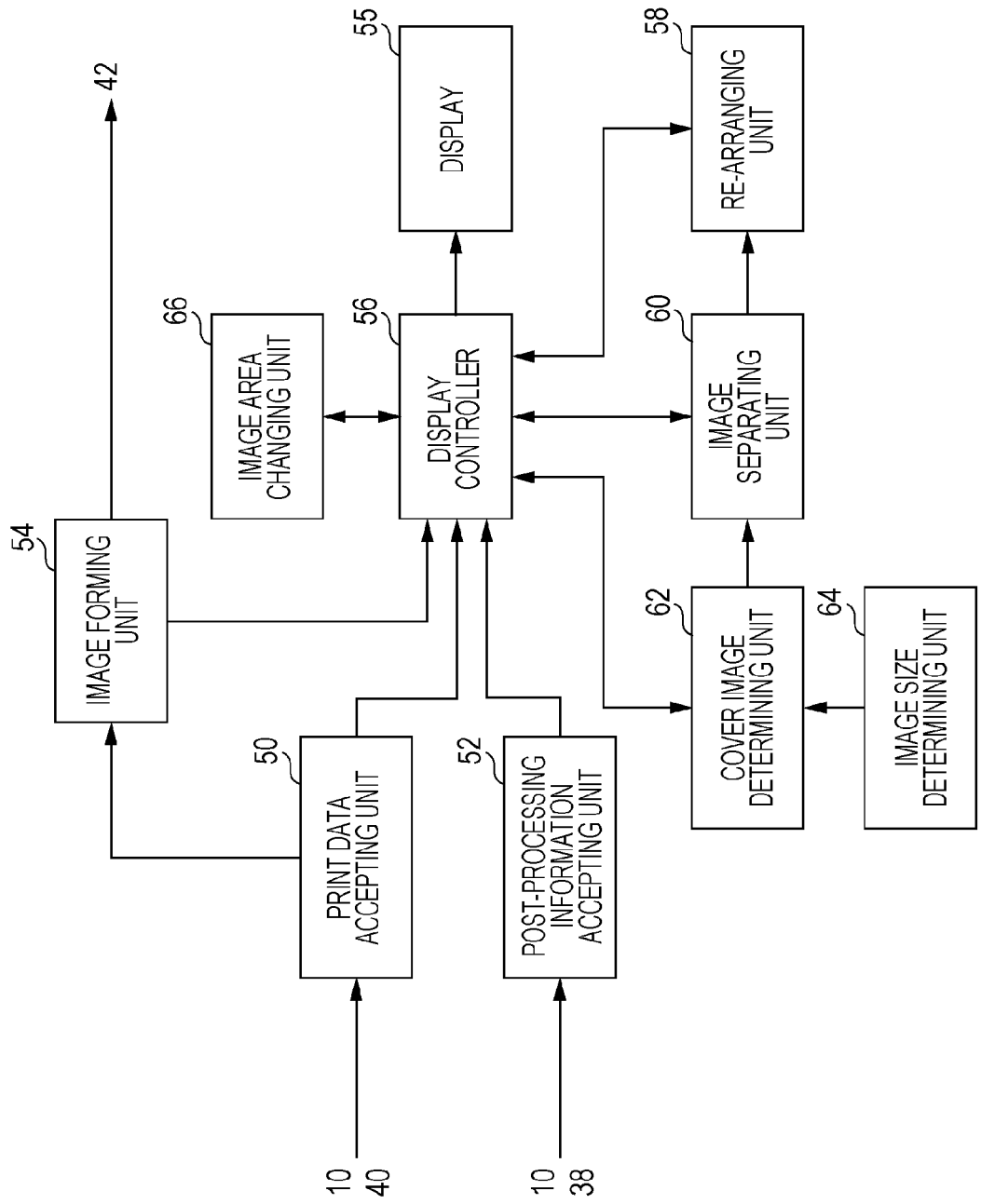

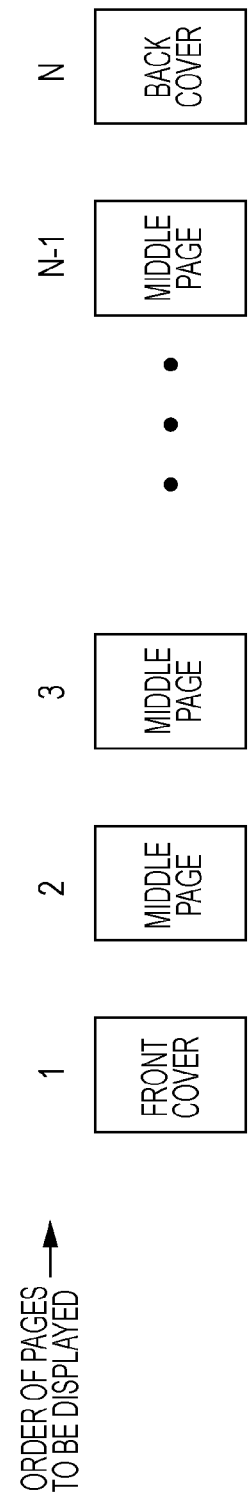

DISPLAY APPARATUS AND METHOD, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-026417 filed Feb. 14, 2013.

BACKGROUND

Technical Field

The present invention relates to a display apparatus and method, an image forming apparatus, and a non-transitory computer readable medium.

SUMMARY

According to an aspect of the invention, there is provided a display apparatus including a display and a display controller. The display displays an image formed by an image forming apparatus. The display controller controls the display to reduce size of at least part of an image serving as a to-be-formed image formed by the image forming apparatus and to display the size-reduced image, in accordance with content of post-processing performed on a recording medium on which the image has been formed by the image forming apparatus.

BRIEF DESCRIPTION OF THE DRAWINGS

An exemplary embodiment of the present invention will be described in detail based on the following figures, wherein:

FIG. 5 is a block diagram showing the functional configuration of the image forming apparatus realized by executing a control program;

FIGS. 6A and 6B are schematic diagrams describing the re-arrangement of pages performed by a re-arranging unit, namely, FIG. 6A shows the order of pages on which images are formed by an image forming unit on the basis of print data accepted by a print data accepting unit, and FIG. 6B shows the order of pages re-arranged by the re-arranging unit with respect to the order of pages shown in FIG. 6A;

FIG. 7A shows the first screen of a display screen showing the size-reduced images, and FIG. 7B shows the second screen displaying a page subsequent to the size-reduced images displayed in FIG. 7A;

FIG. 15A shows the order of pages on which images are formed by the image forming unit on the basis of print data accepted by the print data accepting unit, and FIG. 15B shows the order of pages re-arranged by the re-arranging unit with respect to the order of pages shown in FIG. 15A.

DETAILED DESCRIPTION

Hereinafter, an exemplary embodiment of the invention will be described in detail with reference to the drawings.

Figure 1:
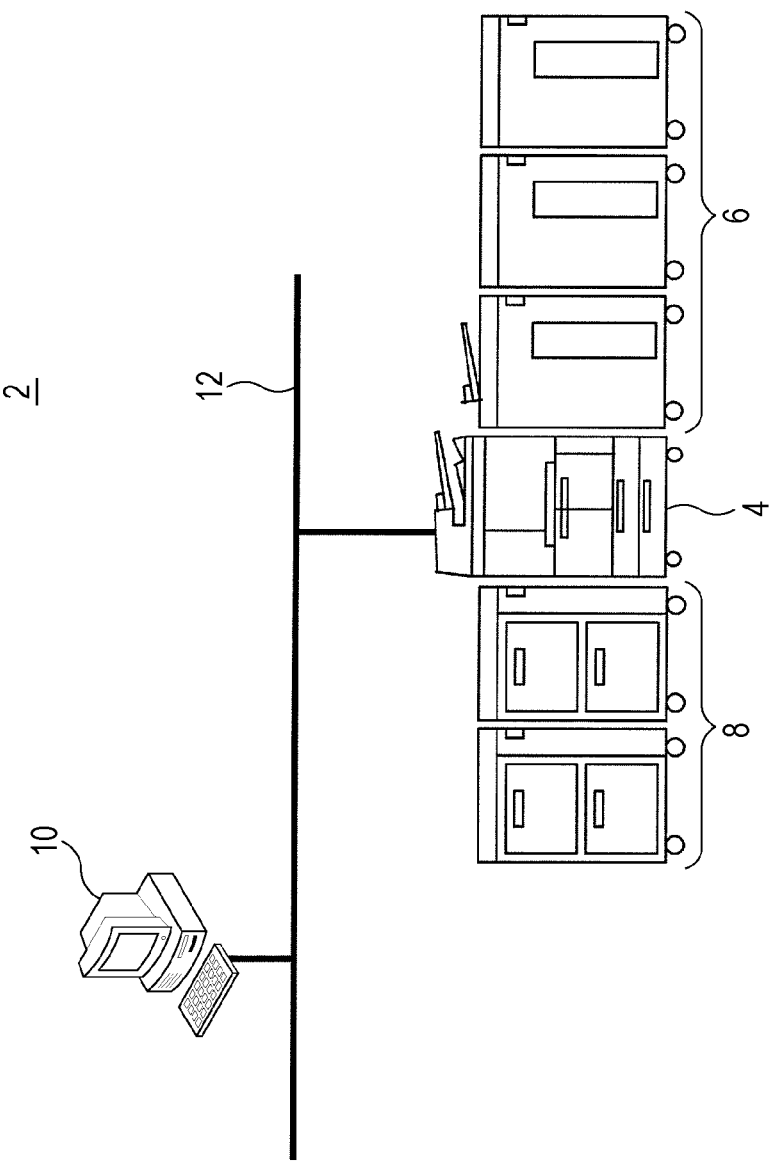
FIG. 1 is a schematic diagram of an image forming system according to an exemplary embodiment of the invention.

FIG. 1 is a schematic diagram of an image forming system 2 according to the exemplary embodiment.

The image forming system 2 according to the exemplary embodiment includes, as shown in FIG. 1, an image forming apparatus 4, a post-processing apparatus 6 which includes multiple apparatuses and which is connected to the image forming apparatus 4, a paper feeding apparatus 8 which includes multiple apparatuses and which is connected to the image forming apparatus 4, and a terminal apparatus 10. The image forming apparatus 4 and the terminal apparatus 10 are connected to each other via a network 12.

The terminal apparatus 10 generates print data and transmits the generated print data to the image forming apparatus 4 via the network 12. The paper feeding apparatus 8 feeds recording media such as sheets to the image forming apparatus 4. The image forming apparatus 4 accepts the print data, transmitted from the terminal apparatus 10, and outputs images in accordance with the print data on the recording media. Also, the image forming apparatus 4 includes an image reading device (not shown) such as a scanner that reads images from documents, and the image forming apparatus 4 also outputs the images read by the image reading device on the recording media. The post-processing apparatus 6 has the function of performing various types of post-processing, such as stapling, punching, cutting, folding, and book binding, on the recording media on which the images have been formed by the image forming apparatus 4.

In the exemplary embodiment, the post-processing apparatus 6 is described as being configured to perform post-processing relating to case binding on recording media ejected from and carried by the image forming apparatus 4.

Figure 2:
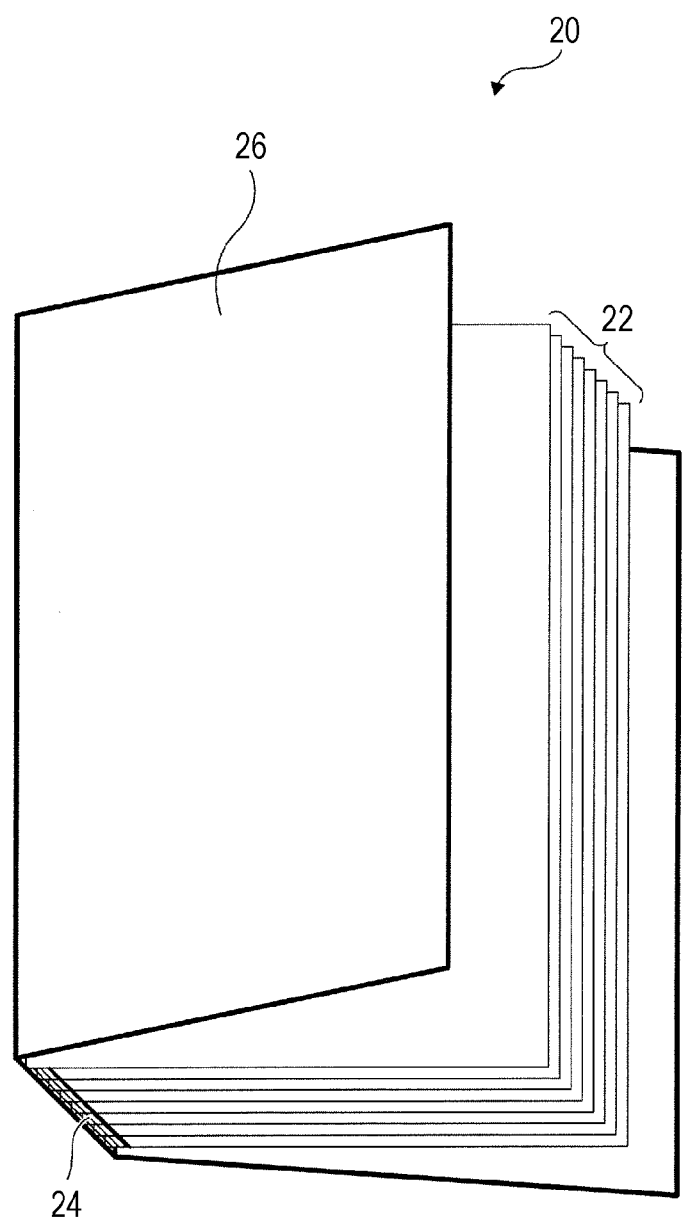
FIG. 2 is a perspective view showing an example of a brochure that has been case-bound by a post-processing apparatus.

FIG. 2 is a perspective view showing an example of a brochure that has been case-bound by the post-processing apparatus 6.

In case binding, as shown in FIG. 2, processing of applying glue to the back 24, which is one side, of middle pages 22, which are a bundle of recording media included in a brochure 20, and attaching the back 24 to a recording medium constituting a cover 26 is performed. The post-processing apparatus 6 according to the exemplary embodiment also performs processing of cutting the recording media.

Figure 3:
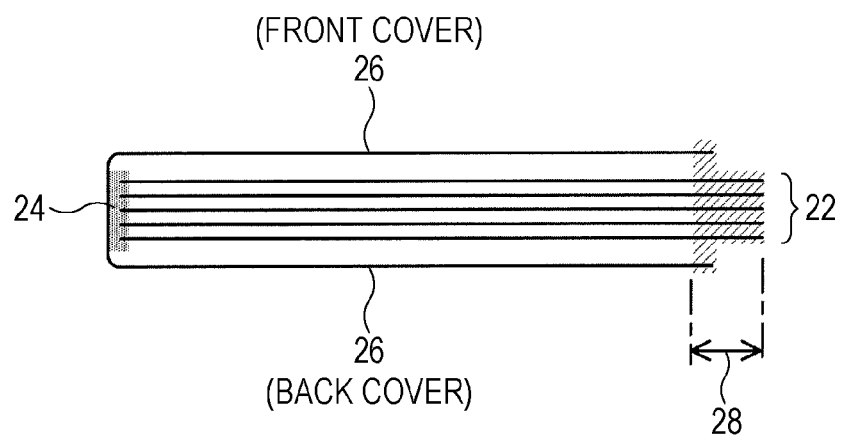
FIG. 3 is a plan view showing an example of areas cut by the post-processing apparatus.

FIG. 3 is a plan view showing exemplary areas (cutting areas) to be cut and removed by the post-processing apparatus 6. In case binding, book binding is performed by wrapping a recording medium with a first size around a bundle of recording media with a second size. For example, when a cover is double the size of middle pages, such as when an A3-size cover wraps A4-size middle pages, as shown in FIG. 3, the cover 26 is incapable of covering the entirety of the middle pages 22. Therefore, the middle pages 22 protrude from the cover 26. In such a case, to add to the appearance of the brochure 20, processing of cutting recording media corresponding to cutting area 28 portions shown in FIG. 3 is performed.

The width of cutting may be a predetermined width or may be determined on the basis of the thickness of the middle pages 22 sandwiched between the cover 26 (front cover) and the cover 26 (back cover). Although the example shown in FIG. 3 describes the case in which the cover 26 and the middle pages 22 are cut, only the middle pages 22 may be cut. Also, the cutting processing may be performed regardless of whether the middle pages 22 protrude from the cover 26. A portion to be cut may not only be a side (edge) facing the back 24 of the brochure 20, but also be a vertical side of the brochure 20.

Figure 4:
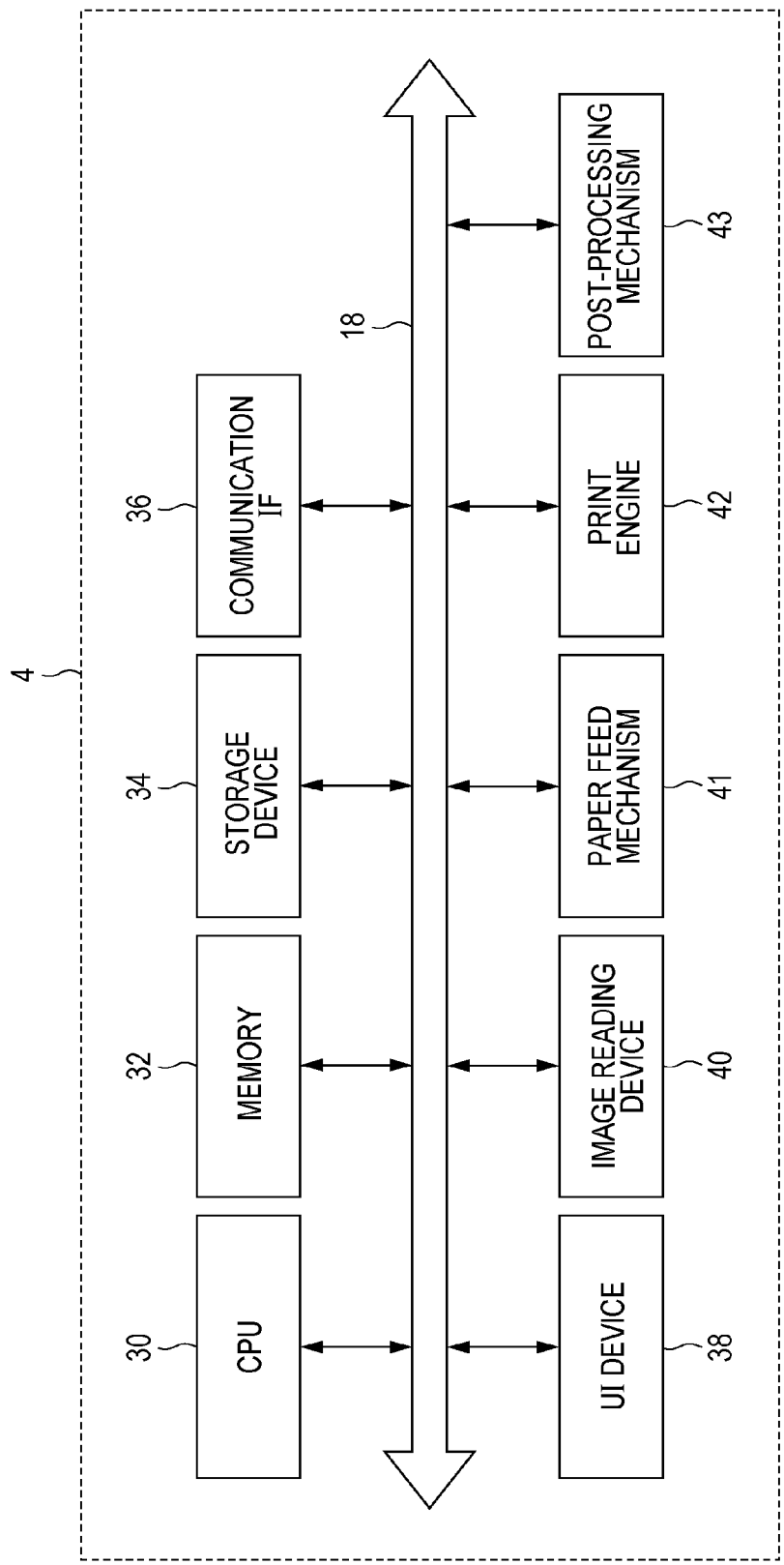
FIG. 4 is a block diagram showing the hardware configuration of an image forming apparatus in the image forming system according to the exemplary embodiment.

Next, FIG. 4 shows the hardware configuration of the image forming apparatus 4 in the image forming system 2 according to the exemplary embodiment.

As shown in FIG. 4, the image forming apparatus 4 includes a central processing apparatus (CPU) 30, a memory 32, a storage device 34 such as a hard disk drive (HDD), a communication interface (IF) 36 that transmits and receives data to and from an external device or the like via the network 12, a user interface (UI) device 38 including a touch panel or a liquid crystal display and a keyboard, an image reading device 40, a paper feed mechanism 41, a print engine 42, and a post-processing mechanism 43. These elements are connected via a control bus 44.

The CPU 30 executes processing on the basis of a control program stored in the memory 32 or the storage device 34 and controls the operation of the image forming apparatus 4.

In the exemplary embodiment, the CPU 30 has been described as being configured to read and execute a control program stored in the memory 32 or the storage device 34. Alternatively, the program may be stored in a storage medium such as a compact-disc read-only memory (CD-ROM) or the like and may be provided to the CPU 30.

FIG. 5 is a block diagram showing the functional configuration of the image forming apparatus 4 realized by executing the above-described control program. Note that part or entirety of the configuration shown in FIG. 5 may be realized by hardware such as an application-specific integrated circuit (ASIC) or a field-programmable gate array (FPGA).

As shown in FIG. 5, the image forming apparatus 4 includes a print data accepting unit 50, a post-processing information accepting unit 52, an image forming unit 54, a display 55, a display controller 56, a re-arranging unit 58, an image separating unit 60, a cover image determining unit 62, an image size determining unit 64, and an image area changing unit 66.

In the exemplary embodiment, as shown in FIG. 5, these units are described as the functions of the image forming apparatus 4. Alternatively, the units other than the image forming unit 54 may be realized as the functions of the UI device 38 serving as a display device. In this case, the UI device 38 may be provided as a separate device, instead of being part of the image forming apparatus 4.

The print data accepting unit 50 accepts print data from the terminal apparatus 10 or the image reading device 40. For example, print data includes image information of multiple pages formed on recording media subjected to post-processing performed by the post-processing apparatus 6.

The post-processing information accepting unit 52 accepts, from the terminal apparatus 10 or the UI device 38, information indicting the content of post-processing performed by the post-processing apparatus 6 on recording media on which images based on print data have been formed. Information indicating the content of post-processing includes, for example, information indicating that case binding processing is performed on recording media or information indicating that cutting processing is performed on recording media. Information indicating the content of post-processing may further include information such as setting values in post-processing (such as the above-described width of cutting or information indicating whether pages are to be bound on the right side or the left side). The user may specify the content of post-processing by using the terminal apparatus 10 or the UI device 38.

The image forming unit 54 prints and forms images on recording media by using the print engine 42 on the basis of print data accepted by the print data accepting unit 50. The recording media on which images have been formed are fed to the post-processing apparatus 6, and the specified post-processing is performed. In the exemplary embodiment, the post-processing apparatus 6 performs case binding processing and cutting processing.

The display 55 displays an image on the UI device 38.

The display controller 56 controls the display 55 to reduce at least some of images serving as to-be-formed images to be formed by the image forming apparatus 4 and to display the size-reduced images, in accordance with the content of processing performed by the post-processing apparatus 6 which performs post-processing on recording media on which the images have been formed by the image forming apparatus 4.

The display controller 56 according to the exemplary embodiment performs control to display size-reduced images (display thumbnails) of to-be-formed images in the order of pages subsequent to processing performed by the post-processing apparatus 6.

Also, the display controller 56 according to the exemplary embodiment performs control to cut out image areas, subsequent to cutting processing performed by the post-processing apparatus 6, from image areas of images serving as to-be-formed images, and display the cut-out image areas, and not to display image areas that are cut by cutting processing. Specifically, the display controller 56 performs control to display images whose image areas are changed by the image area changing unit 66 described later.

The re-arranging unit 58 re-arranges the order of pages of a group of images of multiple pages, on which images are requested to be formed on the basis of print data accepted by the print data accepting unit 50, in accordance with the content of post-processing. Specifically, the re-arranging unit 58 re-arranges the order of pages to the order of pages subsequent to post-processing performed by the post-processing apparatus 6 on the basis of post-processing information accepted by the post-processing information accepting unit 52. That is, the re-arranging unit 58 re-arranges the order of pages specified by print data to the order of pages subsequent to post-processing, which is determined by the content of post-processing.

FIGS. 6A and 6B are schematic diagrams describing the re-arrangement of pages performed by the re-arranging unit 58. FIG. 6A shows the order of pages on which images are formed by the image forming unit 54 on the basis of print data accepted by the print data accepting unit 50. FIG. 6B shows the order of pages re-arranged by the re-arranging unit 58 with respect to the order of pages shown in FIG. 6A.

The example shown in FIG. 6A shows the case in which, after an image is formed on a recording medium serving as the cover 26 of case binding, images are formed on recording media serving as the middle pages 22. The order of pages in this example starts with the back cover page serving as the first page, followed by the front cover page, and followed by the middle pages. However, when case binding is performed by the post-processing apparatus 6, the order of pages subsequent to book binding starts with the front cover page serving as the first page, followed by the middle pages, and finishes with the back cover page. The re-arranging unit 58 re-arranges the order of pages specified by the print data to the order of pages subsequent to post-processing.

The example shown in FIG. 6A shows the case in which, after an image is formed on a recording medium serving as the cover 26 of case binding, images are formed on recording media serving as the middle pages 22. The order of forming an image on a recording medium serving as the cover 26 may be, besides the example shown in FIG. 6A, inserted in between image formation on recording media serving as the middle pages 22, or an image may be finally formed on a recording medium serving as the cover 26.

As shown in FIG. 6A, case binding forms an image of the front cover page and an image of the back cover page on one recording medium. In this case, to re-arrange pages, images to be formed on the recording medium are necessary to be separated into an image of the front cover page and an image of the back cover page.

The image separating unit 60 separates, among images serving as to-be-formed images, an image constituted of multiple pages into images on a page-by-page basis. Specifically, the image separating unit 60 separates an image constituting multiple pages in pages subsequent to post-processing into images on a page-by-page basis. In the exemplary embodiment, when post-processing is performed on a recording medium on which an image serving as a to-be-formed image has been formed, and, as a result, when non-consecutive pages are constituted on the recording medium, the image formed on the recording medium is separated into images on a page-by-page basis.

For example, as described above, when a recording medium on which a cover image including the front cover and the back cover has been formed is case-bound, the image is formed on non-consecutive pages, that is, the first page serving as the front cover and the last page serving as the back cover, of the recording medium. The image separating unit 60 separates the cover image including the front cover and the back cover into an image of the front cover and an image of the back cover, and the re-arranging unit 58 re-arranges the pages as described above on the basis of the separated images. When no image is formed on the back cover, the image separating unit 60 separates an image of the front cover from the cover image. When no image is formed on the front cover, the image separating unit 60 separates an image of the back cover from the cover image. In the exemplary embodiment, the image separating unit 60 separates images from a cover image determined by the cover image determining unit 62 described below.

Next, determination of a cover image will be described. The cover image determining unit 62 determines which of multiple images serving as to-be-formed images, which are requested to be formed on the basis of print data, is a cover image. In the exemplary embodiment, the cover image determining unit 62 extracts, from multiple images serving as to-be-formed images, an image whose size at the time of image formation is greater than other images, on the basis of the size of each image determined by the image size determining unit 64, and determines the extracted image as a cover image. As described above, case binding includes a recording medium with a first size and recording media with a second size. An image formed on the largest recording medium is determined as a cover image.

Alternatively, the cover image determining unit 62 may determine a cover image by using another method. For example, the cover image determining unit 62 may determine a cover image on the basis of information specifying a cover image among multiple images serving as to-be-formed images. Information specifying a cover image may be included in print data, or may be obtained from input information from the terminal apparatus 10 or the UI device 38.

For multiple images serving as to-be-formed images, the image size determining unit 64 determines the size of each image at the time of image formation, on the basis of print data.

The image area changing unit 66 cuts out image areas predetermined as image areas subsequent to cutting processing performed by the post-processing apparatus 6, from image areas of images serving as to-be-formed images, in accordance with the width of cutting in cutting processing based on information accepted by the post-processing information accepting unit 52, and changes the image areas of images to be displayed.

Figure 7A:
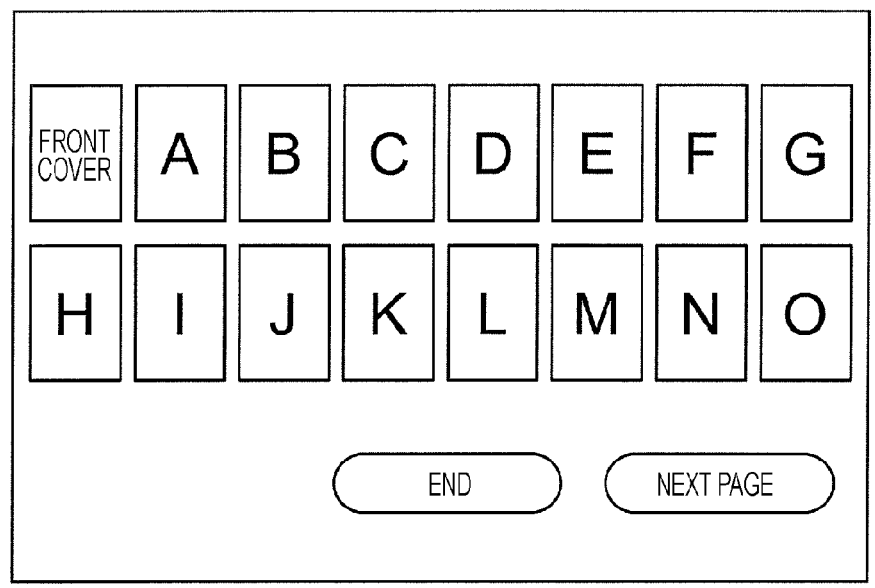
FIGS. 7A and 7B are plan views showing examples of size-reduced images of to-be-formed images displayed under control of a display controller, namely.
Figure 7B:
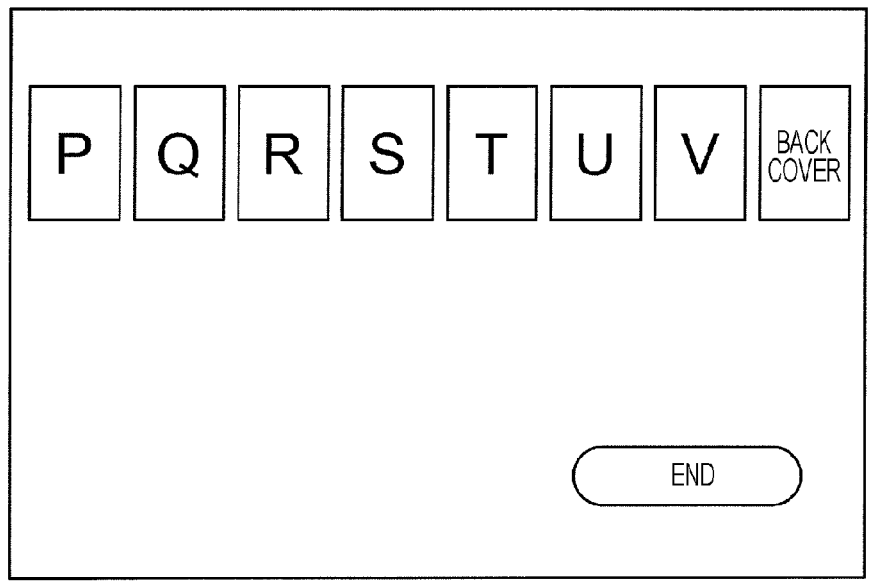

FIGS. 7A and 7B are plan views showing examples of size-reduced images of to-be-formed images displayed under control of the display controller 56. FIG. 7A shows the first screen of a display screen showing the size-reduced images, and FIG. 7B shows the second screen displaying a page subsequent to the size-reduced images displayed in FIG. 7A. As shown in FIGS. 7A and 7B, size-reduced images of images serving as to-be-formed images displayed under control of the display controller 56 are arranged in the order of pages subsequent to post-processing (the order of front cover page, middle pages (A to V), and back cover page) and displayed. In the example shown in FIGS. 7A and 7B, an image area subsequent to cutting processing performed by the post-processing apparatus 6 is displayed in each of the size-reduced images.

Figure 8A:
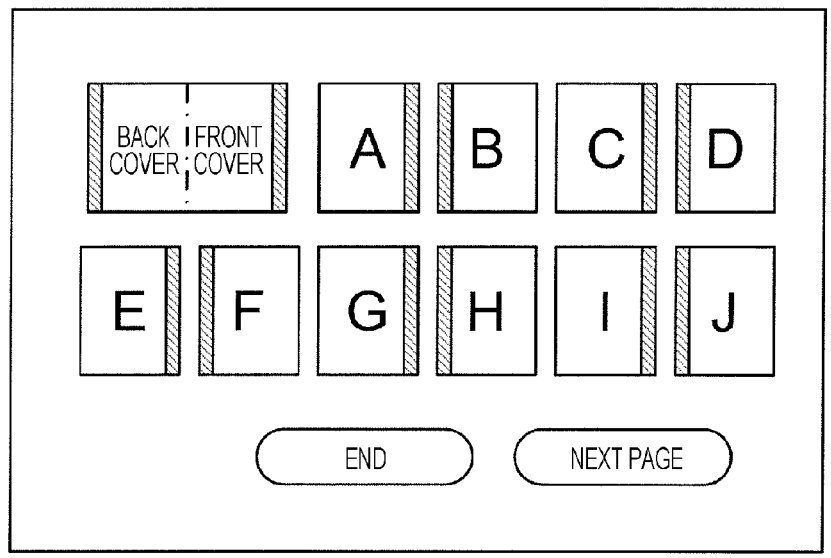
FIGS. 8A and 8B are plan views showing a comparative example relating to displaying of the size-reduced images of the to-be-formed images.
Figure 8B:
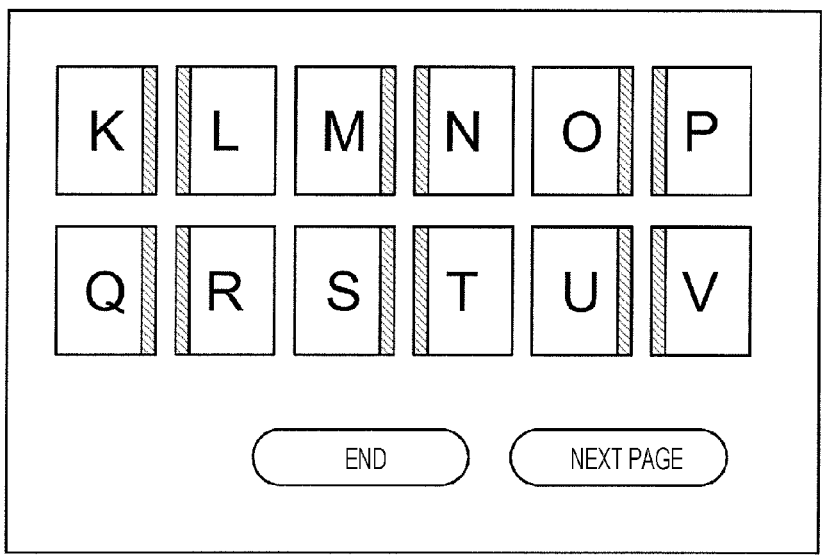

FIGS. 8A and 8B are plan views showing a comparative example relating to displaying of the size-reduced images of the to-be-formed images. FIGS. 8A and 8B show the case in which size-reduced images based on the same print data as that in FIGS. 7A and 7B are displayed as they are without being re-arranged. In the example shown in FIGS. 8A and 8B, areas to be cut are also displayed as they are. In FIGS. 8A and 8B, hatched areas in the size-reduced images indicate areas to be cut by the post-processing apparatus 6.

In the comparative example shown in FIGS. 8A and 8B, the order of pages subsequent to post-processing is not reflected, and the displayed state is different from a state as a result of processing performed by the post-processing apparatus 6. Also, in the comparative example shown in FIGS. 8A and 8B, the state is also different from a state subsequent to cutting processing performed by the post-processing apparatus 6.

In contrast, in the displayed example shown in FIGS. 7A and 7B, the state after post-processing is reflected. Since cutting areas are not displayed, more pages than those shown in FIGS. 8A and 8B are displayed in a display area of the screen.

Figure 9:
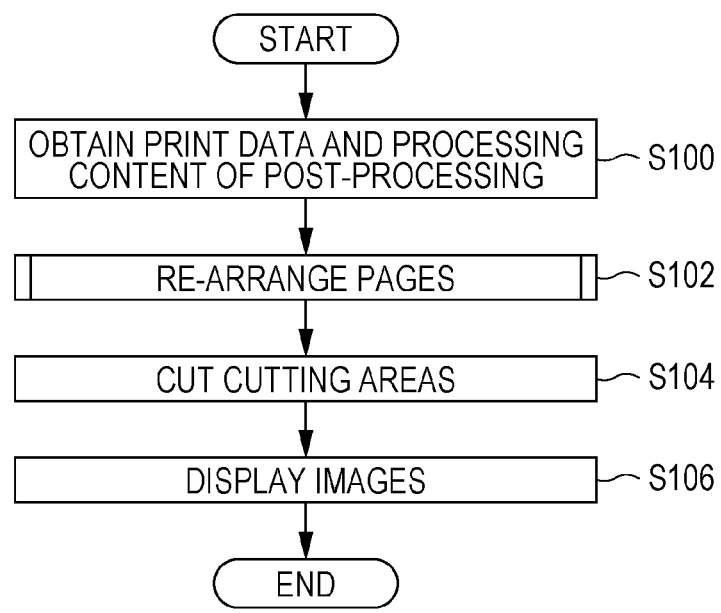
FIG. 9 is a flowchart showing an example of a display operation of the image forming apparatus according to the exemplary embodiment.

FIG. 9 is a flowchart showing an example of a display operation of the image forming apparatus 4 according to the exemplary embodiment.

In step S100, the print data accepting unit 50 and the post-processing information accepting unit 52 obtain print data and content of post-processing, respectively.

In step S102, the re-arranging unit 58 re-arranges the order of pages, specified by the print data, to the order of pages subsequent to post-processing, determined by the content of post-processing. The details of the operation in step S102 will be described using FIG. 10.

In step S104, the image area changing unit 66 cuts, from image areas of images serving as image formation subjects, cutting areas to be cut by the post-processing apparatus 6.

In step S106, the sizes of the images serving as image formation subjects are reduced, and the size-reduced images are displayed. For example, as shown in FIG. 7A, the display controller 56 first displays the first screen. When the user performs an operation to give an instruction to display the second screen, pages that are not accommodated in the first screen are displayed on the second screen, as shown in FIG. 7B.

Next, the re-arranging operation in step S102 will be described.

Figure 10:
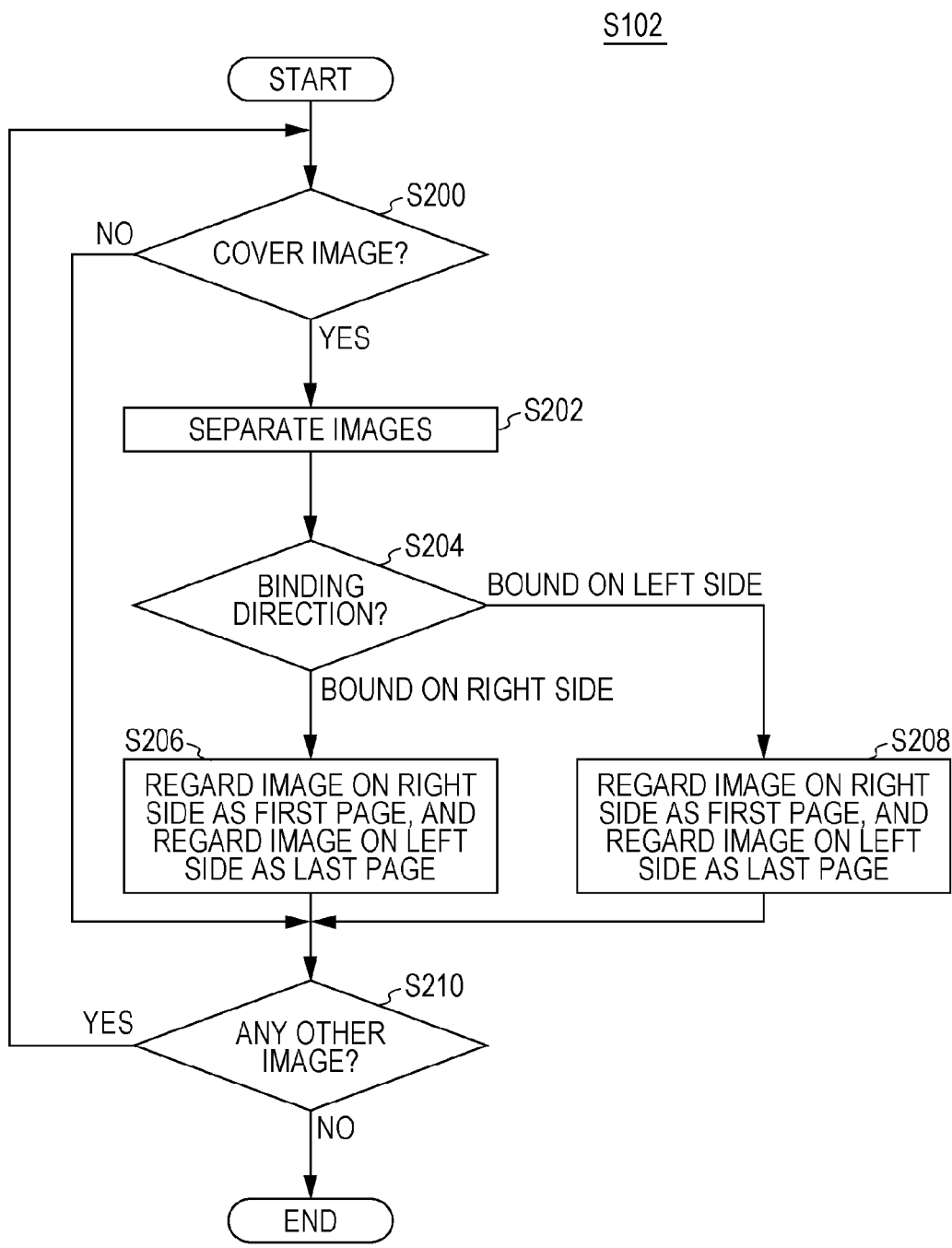
FIG. 10 is a flowchart showing an example of a re-arranging operation performed in step S102 of the flowchart shown in FIG. 9.

FIG. 10 is a flowchart showing an example of the re-arranging operation in step S102.

In step S200, the cover image determining unit 62 determines whether an image requested by the print data to be formed is a cover image. In the exemplary embodiment, the cover image determining unit 62 determines whether the image is a cover image on the basis of the determination performed by the image size determining unit 64.

When the image is a cover image, the process proceeds to step S202. In contrast, when the image is not a cover image (when the image is an image of a middle page), the order specified by the print data is maintained as it is, the pages are not re-arranged, and the process proceeds to step S210. When the order of images of middle pages based on the print data is different from the order of pages of the bound middle pages, the images are re-arranged to the order of pages subsequent to post-processing.

In step S202, the image separating unit 60 separates the cover image into a front cover image and a back cover image.

In step S204, the direction of book binding by the post-processing apparatus 6 is determined on the basis of information accepted by the post-processing information accepting unit 52. When pages are to be bound on the right side, the process proceeds to step S206. When pages are to be bound on the left side, the process proceeds to step S208.

In step S206, the re-arranging unit 58 arranges, of the images separated in step S202, the image on the right side to be the first page in size-reduced display, and arranges the image on the left side to be the last page in size-reduced display.

In step S208, the re-arranging unit 58 arranges, of the images separated in step S202, the image on the left side to be the first page in size-reduced display, and arranges the image on the right side to be the last page in size-reduced display.

In step S210, whether there exists any other image requested by the print data to be formed is determined. When there is such another image, the process returns to step S200, and a similar operation is performed. When the display order in size-reduced display of all the images requested by the print data to be formed is determined, the process ends.

The exemplary embodiment of the invention has been described as above. When cutting processing is performed by the post-processing apparatus 6, the image forming unit 54 may move an image forming position on a recording medium in a direction away from a cutting area on the recording medium (toward the side of the recording medium where cutting is not performed), and may form an image. In this case, the display controller 56 may perform control to cause an image portion whose image forming position is changed to a position corresponding to movement of the image forming position in the image area, as with the case of changing the image forming position by the image forming unit 54.

Figure 11:
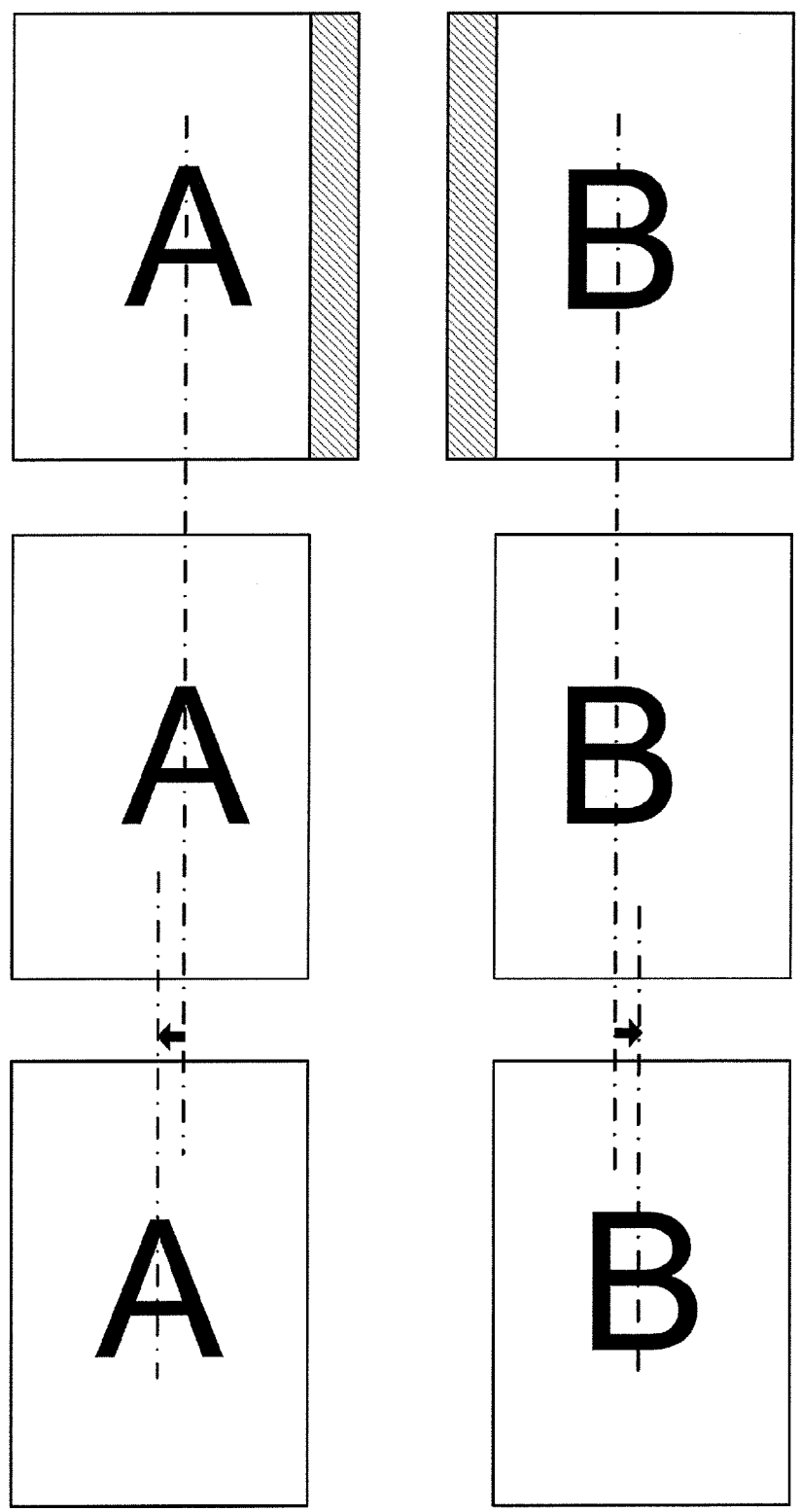
FIG. 11 is a schematic diagram showing an example of size-reduced display in the case where an image forming position on a recording medium is changed.

FIG. 11 is a schematic diagram showing an example of size-reduced display in the case where the image forming position on the recording medium is changed.

In the diagram shown in FIG. 11, an upper portion and a middle portion represent a display example based on the original image forming position before the image forming position is changed, and a lower portion represents a display example based on the changed image forming position when the image forming position is changed by the image forming unit 54. In the upper portion, areas to be cut are shown by being hatched. Also, a column on the left in FIG. 11 represents the case where the right side of the recording medium is cut. In this case, the image forming unit 54 displaces the image forming position to the left and forms an image. A column on the right in FIG. 11 represents the case where the left side of the recording medium is cut. In this case, the image forming unit 54 displaces the image forming position to the right and forms an image.

As shown in FIG. 11, when the image forming unit 54 displaces the image forming position to a side not to be cut, the display controller 56 reflects the change of the image forming position in display.

Further, the display controller 56 may perform control to display two adjacent pages, serving as a double-page-spread of a brochure generated by post-processing performed by the post-processing apparatus 6, at a display interval shorter than that between other adjacent pages. Note that a double-page-spread refers to two adjacent pages when a bound brochure is opened.

Figure 12:
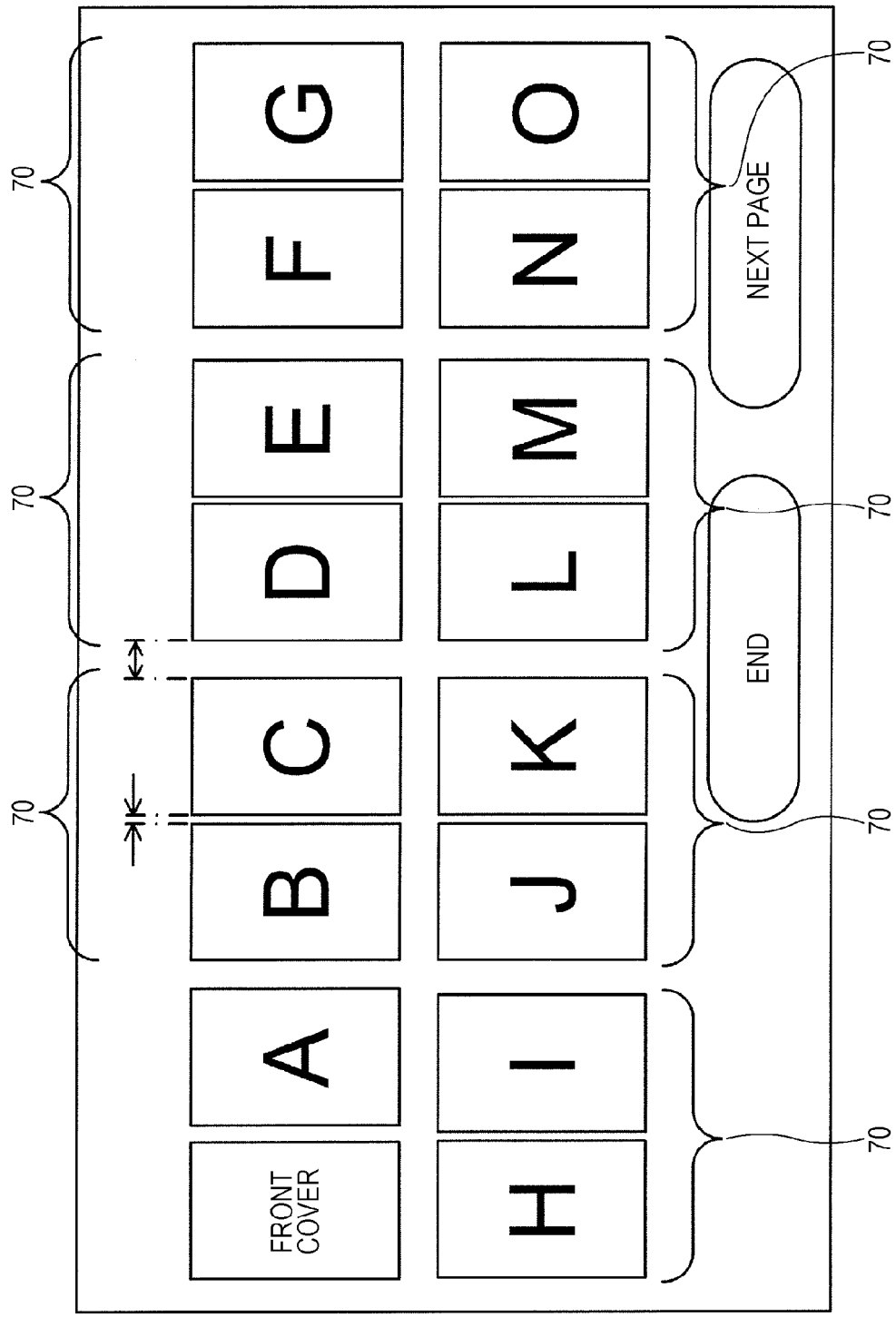
FIG. 12 is a plan view showing an example of adjusting the display interval between two adjacent pages serving as a double-page-spread and displaying the pages.

FIG. 12 is a plan view showing an example of adjusting the display interval between two adjacent pages serving as a double-page-spread and displaying the pages.

As shown in FIG. 12, double-page-spreads 70 are each displayed at a display interval shorter than that between other pages unrelated to a double-page-spread.

Next, a modification of the exemplary embodiment will be described. In the above-described exemplary embodiment, the case in which case binding is performed by the post-processing apparatus 6 has been described. In this modification, the case in which saddle stitch binding is performed, as shown in FIG. 13, will be described by way of example.

Figure 13:
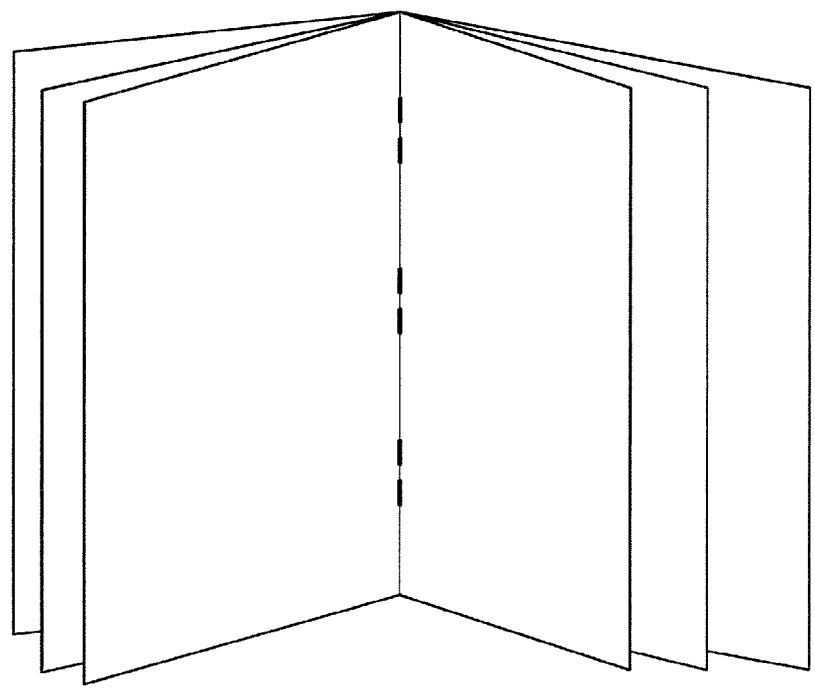
FIG. 13 is a perspective view showing an example of a brochure that has been saddle-stitch bound by the post-processing apparatus.

Firstly, the order of bound pages when saddle stitch binding is performed, as shown in FIG. 13, will be described.

Figure 14:
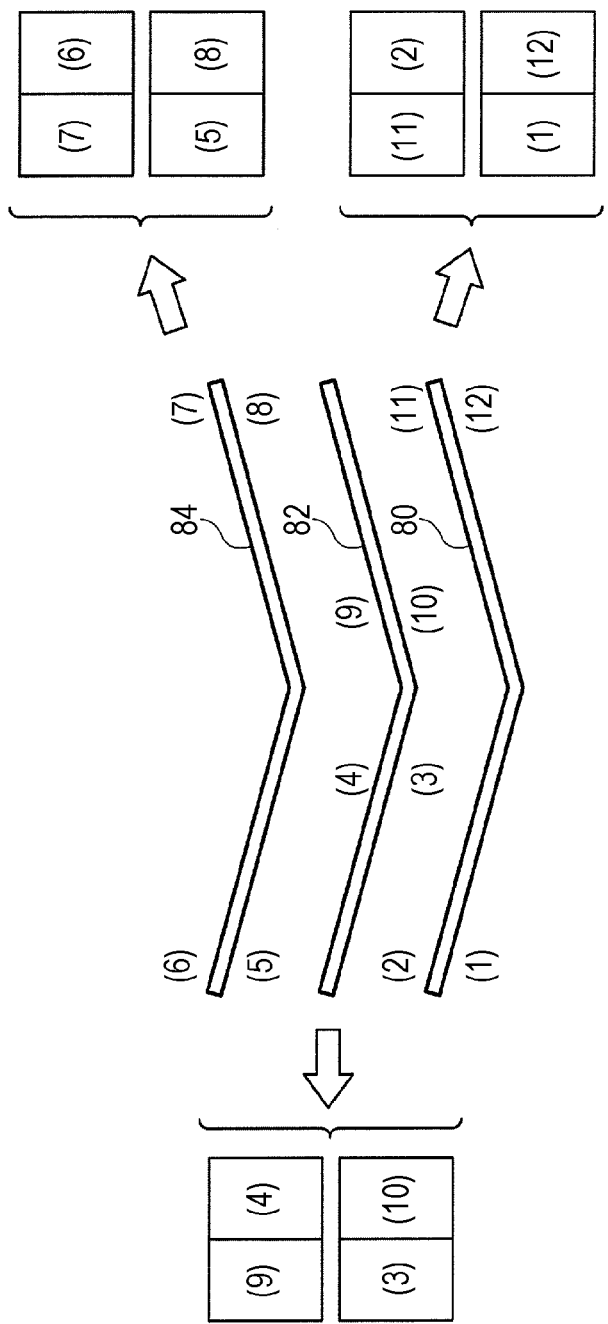
FIG. 14 is a schematic diagram describing the order of pages of the saddle-stitch bound brochure.

FIG. 14 is a schematic diagram describing the order of pages of a saddle stitch bound brochure. Note that FIG. 14 shows a brochure including recording media 80, 82, and 84, and the recording medium 80 constitutes a cover.

Images are formed on both faces of each recording medium. Specifically, images serving as page number 1 and page number 12 after book binding are formed on one face of the recording medium 80, and images serving as page number 2 and page number 11 after book binding are formed on the other face. Also, images serving as page number 3 and page number 10 after book binding are formed on one face of the recording medium 82, and images serving as page number 4 and page number 9 after book binding are formed on the other face. Images serving as page number 5 and page number 8 after book binding are formed on one face of the recording medium 84, and images serving as page number 6 and page number 7 after book binding are formed on the other face.

Figure 15A:
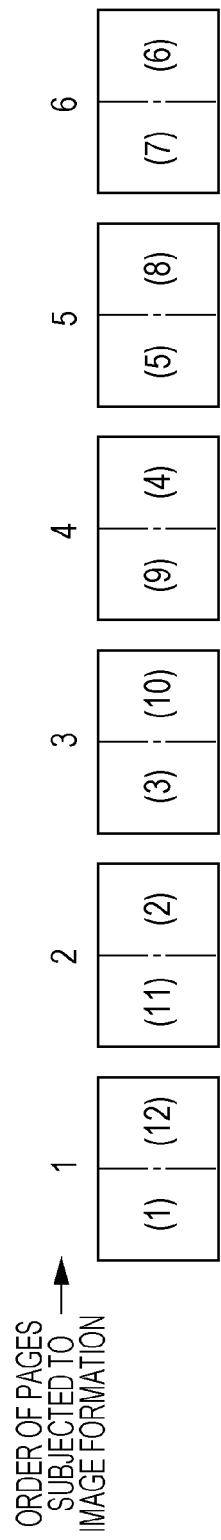
FIGS. 15A and 15B are schematic diagrams describing the re-arrangement of pages constituting the brochure shown in FIG. 14, performed by the re-arranging unit, namely.
Figure 15B:
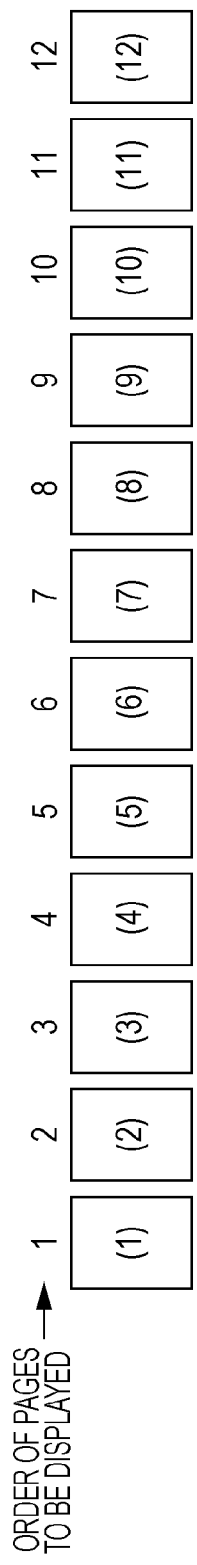

FIGS. 15A and 15B are schematic diagrams describing the re-arrangement, by the re-arranging unit 58, of pages constituting the brochure shown in FIG. 14. FIG. 15A shows the order of pages on which images are formed by the image forming unit 54 on the basis of print data accepted by the print data accepting unit 50. FIG. 15B shows the order of pages re-arranged by the re-arranging unit 58 with respect to the order of pages shown in FIG. 15A.

As shown in FIGS. 15A and 15B, the re-arrangement of pages by the re-arranging unit 58 results in the order of pages subsequent to post-processing, and display is performed in this order.

Figure 16:
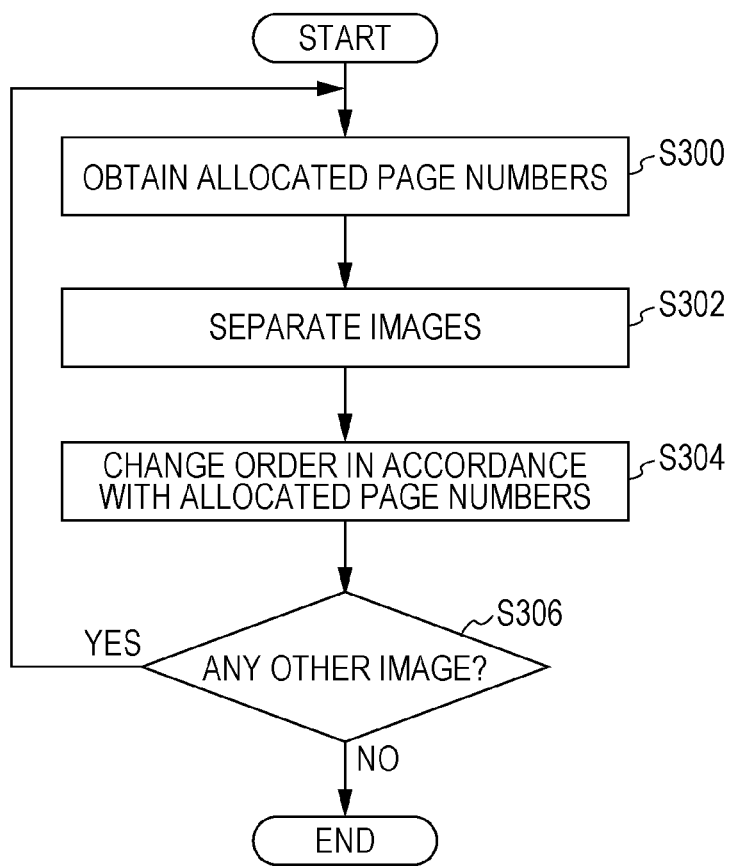
FIG. 16 is a flowchart showing an example of a re-arranging operation performed in step S102 according to a modification.

FIG. 16 is a flowchart showing an example of the re-arranging operation in step S102 according to the modification. In the modification, instead of the operation in step S102 shown in FIG. 10, the operation in step S102 shown in FIG. 16 is performed.

Firstly in step S300, for an image requested by the print data to be formed, the display controller 56 obtains page numbers allocated as pages subsequent to saddle stitch binding. The display controller 56 obtains page numbers allocated to this image from, for example, information on the content of post-processing accepted in step S100. For example, page number 1 and page number 12 are allocated as page numbers subsequent to saddle stitch binding to an image formed on the first face of the recording medium 80. The display controller 56 obtains these allocated page numbers.

Next in step S302, the image separating unit 60 separates the image specified by the print data to be formed into images in units of the allocated pages.

Next in step S304, the re-arranging unit 58 re-arranges the separated images to the order of pages subsequent to saddle stitch binding, in accordance with the page numbers allocated to the separated images.

In step S306, whether there exists any other image requested by the print data to be formed is determined. When there is such another image, the process returns to step S300, and a similar operation is performed. When the display order in size-reduced display of all the images requested by the print data to be formed is determined, the process ends.

The exemplary embodiment and the modification have been described as above. For images whose image areas are changed by the image area changing unit 66, the display controller 56 may perform control not to re-arrange these images and may perform control to reduce the sizes of these images and display the size-reduced images.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
   a display; and
   a display controller configured to cause the display to display reduced-size images of images, which are included in print data to be printed on a recording medium by an image forming apparatus, so that the reduced-size images are displayed as though post-processing cutting, which is to be performed on the recording medium on which the images have been formed, has been performed on the reduced-size images displayed by the display,
   wherein the reduced size images are reduced by at least one of a predetermined width and a width that is based on a thickness of the recording medium on which the images have been formed.

2. The display apparatus according to claim 1, wherein the images included in the print data are a plurality of pages to be printed by the image forming apparatus, and the display apparatus further comprises a re-arranging unit configured to re-arrange an order of pages of the reduced-size images displayed by the display in accordance a post-processing re-arranging that is to be performed on the recording medium on which the plurality of pages has been printed.

3. The display apparatus according to claim 2, further comprising an image separating unit configured to separate the reduced-sized images of the pages on a page-by-page basis,
   wherein the re-arranging unit is configured to re-arrange the separated pages of the reduced-size images on a page-by-page basis.

4. The display apparatus according to claim 3, wherein the separated pages of the reduced-sized images include a cover image including a front cover of a brochure and a back cover of the brochure, and the image separating unit is configured to separate an image of the front cover of the brochure from the cover image.

5. The display apparatus according to claim 4, further comprising a cover image determining unit configured to determine, on a basis of sizes of the images to be formed by the image forming apparatus, which image from among the reduced-sized images is the cover image,
   wherein the image separating unit is configured to separate the image determined by the cover image determining unit as the cover image.

6. The display apparatus according to claim 2, wherein the display controller is configured to perform a control to regard an image, from among the reduced size images, as an image of a front cover which is a to-be-displayed target and to regard another image, from among the reduced-size images, as a not-to-be-displayed target.

7. The display apparatus according to claim 1, further comprising an image area changing unit configured to change an image area of an image of the reduced sized images to an image area subsequent to the post-processing cutting performed by a post-processing apparatus,
   wherein the display controller is configured to perform control to display an image in the image area changed by the image area changing unit.

8. The display apparatus according to claim 1, wherein, in response to the image forming apparatus moving an image forming position on the recording medium in a direction away from a cutting area on the recording medium in accordance with the post-processing cutting to be performed by a post-processing apparatus, the display controller performs control to cause the display to display an image in a manner that corresponds to the movement performed by the image forming apparatus.

9. The display apparatus according to claim 2, wherein the display controller is configured to perform control to cause the display to display two adjacent pages which correspond to a double-page-spread of a brochure generated by post-processing performed by a post-processing apparatus at a display interval shorter than a display interval between other adjacent pages.

10. A non-transitory computer readable medium storing a program for causing a computer to execute a process, the process comprising:
   displaying an image to-be-formed by an image forming apparatus; and
   performing control to display a reduced-size image of the image to-be-formed by the image forming apparatus as though post-processing cutting, which is to be performed on a recording medium on which the image to-be-formed, has been performed on the reduced-size image displayed by the display,
   wherein the reduced size images are reduced by at least one of a predetermined width and a width that is based on a thickness of the recording medium on which the images have been formed.

11. A display method comprising:
   displaying an image to be formed by an image forming apparatus; and
   performing control to cause a display to display a reduced-size image of an image to-be-formed by the image forming apparatus as though post-processing cutting, which is to be performed on a recording medium on which the image to-be-formed, has been performed on the reduced-size image displayed by the display,
   wherein the reduced size images are reduced by at least ne of a predetermined width and a width that is based on a thickness of the recording medium on which the images have been formed.

12. A display apparatus comprising:
   a display configured to display an image formed by an image forming apparatus;
   a display controller configured to control the display to reduce size of at least part of the image serving as a to-be-formed image formed by the image forming apparatus and to display the size-reduced image, in accordance with content of post-processing performed on a recording medium on which the image has been formed by the image forming apparatus;
   a re-arranging unit configured to re-arrange the order of pages of the image serving as the to-be-formed image in accordance with the content of post-processing;
   an image separating unit configured to separate, out of the image serving as the to-be-formed image, an image constituted of a plurality of pages into images on a page-by-page basis; and
   a cover image determining unit configured to determine a cover image from a plurality of images serving as to-be-formed images, on the basis of sizes of the images to be formed,
   wherein the re-arranging unit is configured to re-arrange the images on a page-by-page basis, separated by the image separating unit,
   wherein the image separating unit is configured to separate an image of a front cover of a brochure from a cover image including the front cover of the brochure and a back cover of the brochure, and
   wherein the image separating unit is configured to separate the cover image determined by the cover image determining unit.

13. The display apparatus according to claim 1, further comprising a cover image determining unit configured to determine, on a basis of sizes of images to be formed by the image forming apparatus, which image from among the reduced-sized images is a cover image.

14. The non-transitory computer readable medium according to claim 10, wherein the process further comprises determining, on a basis of sizes of images to be formed by the image forming apparatus, which image from among the reduced-sized images is a cover image.

15. The display method according to claim 11, further comprising determining, on a basis of sizes of images to be formed by the image forming apparatus, which image from among the reduced-sized images is a cover image.

* * * * *